United States Patent
Plumat et al.

[11] 4,048,978
[45] Sept. 20, 1977

[54] HEAT INSULATING SCREEN

[75] Inventors: Emile Plumat, Gilly; Pol Baudin, Ransart; Robert Posset, Mont/S/Marchienne; Jean-Marie Autequitte, Moustier/S/Sambre, all of Belgium

[73] Assignee: Glaverbel-Mecaniver, Brussels, Belgium

[21] Appl. No.: 569,937

[22] Filed: Apr. 21, 1975

Related U.S. Application Data

[63] Continuation of Ser. No. 336,333, Feb. 27, 1973, abandoned.

[30] Foreign Application Priority Data

Mar. 2, 1972   Luxembourg ............................ 64874

[51] Int. Cl.² .................................................. F23M 7/00
[52] U.S. Cl. ........................................ 126/200; 350/1
[58] Field of Search ....................... 126/200; 161/1, 44; 117/124 A, 33.3; 65/30; 350/1

[56] References Cited

U.S. PATENT DOCUMENTS

| | | | |
|---|---|---|---|
| 2,612,154 | 9/1952 | Mills ..................................... | 126/200 |
| 2,695,247 | 11/1954 | Junge ..................................... | 117/54 |
| 2,779,136 | 1/1957 | Hood et al. .......................... | 65/30 E |
| 3,457,138 | 7/1969 | Miller ................................... | 126/200 |
| 3,507,267 | 4/1970 | Lafforgue ............................ | 126/200 |
| 3,630,809 | 12/1971 | Edwards ............................... | 161/2 |
| 3,666,534 | 5/1972 | Aachen et al. ......................... | 117/97 |
| 3,677,814 | 7/1972 | Gillery .................................. | 117/211 |
| 3,880,631 | 4/1975 | Ripley .................................. | 65/30 E |

*Primary Examiner*—John J. Camby
*Assistant Examiner*—Larry I. Schwartz
*Attorney, Agent, or Firm*—Cushman, Darby & Cushman

[57] ABSTRACT

A heat insulating screen forming a part of an oven or furnace comprising two or more sheets of glass of vitrocrystalline material mounted in facing relationship, one sheet providing one exterior face of the screen having been subjected to a chemical tempering treatment, the other sheet providing the other exterior face of the screen having improved thermal properties which are obtained either by utilizing a borosilicate glass which has a coefficient of thermal expansion of less than $5 \times 10^{-6}/° C$ or a sheet bearing at least one coating capable of screening off a significant amount of incident infrared radiation.

21 Claims, 10 Drawing Figures

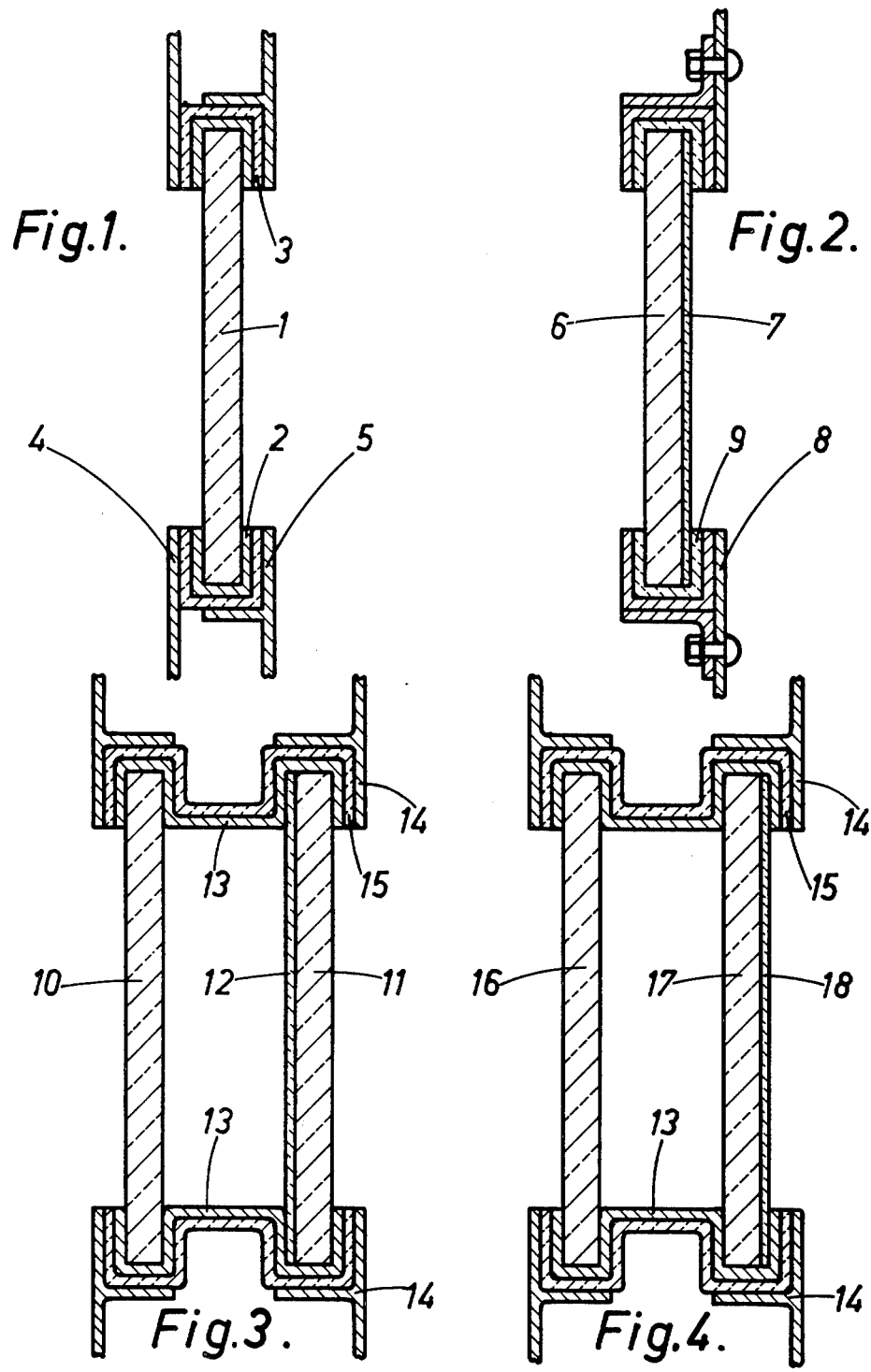

HEAT INSULATING SCREEN

This is a continuation, of application Ser. No. 336,333 filed Feb. 27, 1973 now abandoned.

This invention relates to a heat-insulating screen adapted to form part of a boundary of an oven or furnace.

Glass sheets are of potential value in the construction of heat-insulating screens for various types of articles and installations. An example is the use of such sheets in the manufacture of inspection windows or doors of ovens and furnaces.

However, untreated glass panels are not suitable for use in heat-insulating screens to be incorporated in the walls of ovens and furnaces which are heated to high temperatures because such sheets are not able to meet minimum strength requirements. It is not only mechanical strength, or in other words, resistance to breakage under externally applied mechanical forces, which is important, but also the ability of the screen to resist thermal shock. Another very important factor is the strength to weight ratio of the sheet or sheets forming the screen.

The present invention enables heat-insulating screens incorporating one or more glass or vitrocrystalline sheets to be manufactured to meet various technical specifications which cannot be met by the previously proposed glass screens.

According to the present invention there is provided a heat-insulating screen adapted to form part of a boundary of an oven or furnace, characterized in that such screen comprises at least one sheet of glass or vitrocrystalline material at least one portion of which has been chemically tempered.

The invention affords a combination of important advantages. By using a chemically tempered sheet of glass or vitrocrystalline material, it is possible to form a screen having a high mechanical strength and resistance to thermal shock while at the same time using a sheet which is considerably thinner than an untempered sheet of comparable strength. Furthermore, a tempered sheet will, in general, maintain its mechanical strength over a greater temperature range than similar but untempered sheet. Because a chemically tempered sheet may be relatively thin, it may therefore be of comparatively low weight, and this is of considerable practical value in oven and furnace manufacture where considerations of weight are important inter alia because if a heavy screen is used, the weight of the installation is increased both on that account, and also due to the necessity to use heavy mountings for the screen: that is wasteful of raw materials and is economically disadvantageous particularly in the case of mass-produced cooking ovens. The invention affords the further advantage that a chemically tempered sheet exhibits the specified advantageous properties even at very high temperatures such as are attained for example when the sheet forms a part of a screen incorporated in a furnace wall.

The sheet or sheets of glass or vitrocrystalline material incorporated in the screen may be flat or curved, and in the case of curved sheets, the curvature may be such that the surfaces of the sheets are developable or not. Moreover, any sheet embodied in the screen may be of uniform thickness, or it may vary in thickness from one part to another, e.g., in the manner of a lens.

Each glass or vitrocrystalline sheet incorporated in a screen may be transparent. Such a screen can be used as an observation window of an oven or furnace.

Each sheet may be a sheet of soda-lime glass. Soda-lime glass is relatively inexpensive.

The chemical tempering of a glass or vitrocrystalline sheet, as is known per se, involves the diffusion of ions into surface layers of the sheet from a contacting medium while the sheet is heated, and under such conditions that compressive surface stresses are set up in the said layers as such diffusion takes place or subsequently when the sheet cools. It is preferable for a chemical tempering treatment of a sheet used in a screen according to the invention to be one in which diffusion of ions into the surface layers of the sheet has taken place at both sides of the sheet and over the whole of its area, or substantially so. But in some cases it is suitable to use a sheet which has been tempered by diffusion of ions into only one of its faces.

In preferred embodiments of the invention, the screen incorporates at least one said glass or vitrocrystalline sheet which has been subjected to a chemical tempering treatment of a kind involving the exchange of alkali metal ions between the sheet and a treatment medium. Such treatments may be carried out quite easily and inexpensively, and permit very high compressive surface stresses to be set up so that the sheet has a very high strength to weight ratio. Treatments involving such exchange of alkali metal ions can be classified into high and low temperature treatments. In high temperature ion exchange treatments, ions in surface layers of a glass sheet are substituted while the glass is at a temperature above its annealing point by ions which confer on the said surface layers a lower coefficient of thermal expansion. In low temperature ion exchange treatments, ions in surface layers of the glass are substituted by larger ions while the glass is at a temperature below its annealing point.

In the manufacture of the most preferred embodiments of screen according to the invention, use is made of a process according to that second type of chemical tempering treatment, and said screen incorporates at least one said glass or vitrocrystalline sheet which has been subject to a chemical tempering treatment involving the diffusion of potassium ions into the sheet in exchange for sodium ions. A sheet which has been chemically tempered by such a process retains its compressive surface stresses up to relatively high temperature levels.

There are other types of chemical tempering treatment which can be used in preparing a sheet of glass or vitrocrystalline material for use in a screen according to the invention. For example, compressive surface stresses can be set up in surface layers of the glass by causing ions to diffuse into such layers from a contacting medium under the influence of an electric field so that there is no accompanying diffusion of ions into such medium from the glass or vitrocrystalline material.

Preferably a screen according to the invention comprises at least two glass or vitrocrystalline sheets mounted in spaced facing relationship, at least one said sheet having been chemically tempered and providing one of the exterior faces of the screen. Such a screen can have very good heat-insulating properties.

The invention includes a screen incorporating at least two said spaced facing sheets, spaced apart by a distance at least equal to the thickness of such sheets or to the thickness of the thinner of them if they are of different thicknesses. The observance of this condition is helpful for achieving an efficient thermal insulation. In general the efficiency tends to be greater according as the inter-sheet spacing is greater. By judicious selection of this spacing it is possible to insure that the temperature of one of the exterior faces of the screen will be lower than the temperature of the other of such faces by at least a certain minimum value when the said other face is directly exposed to the interior of an oven or furnace at a given working temperature. The temperature differential may for example be such as to reduce or eliminate the risk of persons suffering burns by touching the outside of the screen. This safety factor is of particular importance in the case of screens for appliances such as domestic ovens to be used where children are about.

Preferably, in a screen incorporating spaced sheets as aforesaid, there is one said sheet which is composed of a borosilicate glass which has a coefficient of thermal expansion of less than $5 \times 10^{-6}/°$ C. and which forms the other of the exterior faces of the screen. A borosilicate glass sheet is very resistant to thermal shock, and therefore such a screen has advantageous properties when mounted with the borosilicate glass sheet at the side of the screen facing the interior of the oven or furnace.

In some preferred embodiments of the invention, the screen comprises at least one said sheet of glass or vitrocrystalline material having at least one coating capable of screening off a significant amount of incident infrared radiation. The presence of such a coating further improves the heat-insulating capacity of the screen.

Such a coating may consist of a single layer or it may be a plural layer coating comprising a number of layers of similar or different thicknesses. The different layers of the coating may be of the same coating material, or of different coating materials.

In certain preferred embodiments of screen according to the invention there is a first glass or vitrocrystalline sheet which has been chemically tempered and which provides one of the exterior faces of the screen, and at least one other glass or vitrocrystalline sheet bearing an infrared reflecting coating. When such a screen is mounted in an oven or furnace wall with said first sheet directed toward the outside of the oven or furnace, the tempered sheet is kept at a lower temperature than would be the case if no such coated sheet were present. This enables the sheet outside such coated sheet to maintain adequate mechanical strength over a greater working temperature range within the oven or furnace, and also, for the same working temperature range enables the outer sheet to be made thinner while affording the same mechanical strength.

Furthermore, certain other preferred embodiments provide that the said sheet bearing an infrared reflecting coating forms the other exterior face of the screen and has been chemically tempered. Again, such coated sheet can be made thinner for the same mechanical strength, thus reducing the total weight of the screen. Such embodiments also confer the particular advantage that both exterior faces of the screen may be made highly resistant to mechanical shock, and this is of great practical importance where both such faces of the screen may from time to time be exposed, as in the case where the screen is incorporated in a cooking oven door.

Preferably, there is at least one said glass or vitrocrystalline sheet which is provided with a said infrared screening coating which imparts to the sheet a low energy transmission and a high energy reflection in at least a portion of the wavelength range from 0.8 to 15 microns. This is the most important of the wavelength ranges of infrared radiation emanating from the inside of an oven or furnace which requires to be screened.

Advantageously, there is at least one coating which is metallic. Metallic coatings have good infrared reflecting properties. Moreover, such coatings can readily be applied to chemically tempered sheets.

Preferably there is at least one said coating which comprises one or more of the following metals: gold, silver, aluminum, copper and palladium, since such metals are particularly well adapted to reflect infrared radiation.

Alternatively, there is at least one said coating which comprises an oxide or a mixture of oxides. Many oxide coatings are very effective as infrared radiation screens, while at the same time allowing good visibility through the screen.

Certain embodiments provide that there is at least one oxide selected from the following group: tin oxide, indium oxide. These oxides are most efficient and are also hard and wear resistant.

Preferably there is at least one said oxide coating which contains a doping agent whereby the infrared radiation reflecting properties of the coating may be considerably enhanced.

In embodiments of the invention wherein there is at least one said coating which comprises tin oxide, it is preferable for the doping agent to be ions or atoms of antimony and/or fluorine and/or chlorine, and in those embodiments wherein there is at least one said coating which comprises indium oxide, it is preferable for the coping agent to be ions or atoms of tin and/or fluorine and/or chlorine. Such doping elements are the most efficient for use in conjunction with the respective oxides.

Advantageously, there is at least one said oxide coating having a minimum thickness of 1000A, since this thickness is in many cases considered to be the practical minimum required to obtain adequate infrared radiation reflection.

In some preferred embodiments of the invention, there is at least one said coating comprising a sulphide, or a nitride, or a carbide, since such compounds form efficient infrared screening coatings. Furthermore, many such compounds are extremely hard and abrasion resistant and have high chemical stability, so that a coating of one of these compounds may be applied to one of the exterior faces of the screen without risk of damage, whether by abrasion on an exposed panel face, or by chemical action when a coating comprising such a compound is directed toward the inside of an oven or furnace.

Preferably, beneath at least one such coating there is a foundation layer of material which is chemically inert in relation to such coating and the material of the coated face of the coated sheet. This feature is of particular importance where there is risk of a reaction between the coating material and the sheet which might impair the radiation screening efficiency of the coating, or where the coating is applied to a chemically tempered sheet when ions from the coating material might diffuse into surface layers of the sheet and reduce the compressive surface stresses set up in the sheet by the chemical tempering process.

Certain advantageous embodiments provide that there is at least one such coating which comprises indium oxide beneath which there is a foundation layer of silica. In this way, a reaction between such indium oxide coating and any potassium ions in the coated sheet is prevented.

Preferably, the visible light transmission of the screen is greater than or equal to 20%. It is desirable for this level of visible light transmission to obtain if adequate visibility through the screen is to be maintained.

The invention includes an oven or furnace incorporating a heat insulating screen as herein defined.

When installed in an oven or furnace, it is preferred that such screen comprises at least two sheets of glass or vitrocystalline material, at least the outer sheet being chemically tempered over at least one portion. The side of the screen which is directed toward the outside of the oven or furnace is thereby given a high mechanical strength which is important from the point of view of safety.

Advantageously, the screen comprises a first sheet of glass or vitrocrystalline material bearing an infrared screening coating and directed toward the inside of said furnace or oven and a second sheet which is chemically tempered and directed toward the outside of the furnace or oven. By this means, a significant proportion of infrared radiation incident on the screen is prevented from penetrating the screen.

The invention includes a glass furnace incorporating a heat insulating screen as herein defined, and also includes an oven for cooking foodstuffs which incorporates a heat insulation screen as herein defined.

Various preferred embodiments of the invention will now be described by way of example and in greater detail with reference to the accompanying diagrammatic drawings, in which:

FIGS. 1 and 2 each show an embodiment of heat insulating screen suitable for use as an observation window in a cooking oven, each screen comprising a single sheet of chemically tempered glass;

FIGS. 3 and 4 are sectional views through heat insulating screens having two sheets of glass;

EXAMPLE 1

Figure 5:
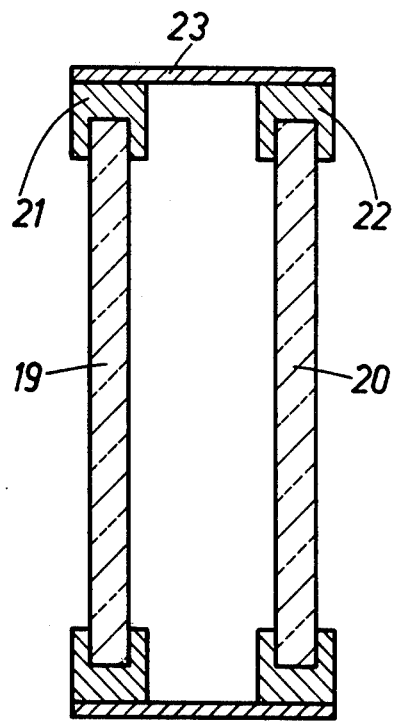
FIGS. 5 and 6 are sectional views of variants of heat insulating screens with no infrared screening coating applied to the sheets constituting the screens.

FIG. 1 shows in section an observation window suitable for use in an oven in which foodstuffs are cooked, the window comprising a sheet 2mm in thickness of transparent soda-lime glass 1 of ordinary composition (72% $SiO_2$, 12.5% $Na_2O$, 0.09% $K_2O$, 9.4% CaO, 3% MgO, 3% $Al_2O_3$, 0.01% $Fe_2O_3$ by weight) which has been chemically tempered and thus mechanically reinforced by an ion diffusion treatment setting up compressive stresses in the surface layers of the sheet. The chemical tempering treatment performed was a low temperature ion diffusion treatment which consisted in immersing the sheet in a bath of molten potassium nitrate at 470° C. During the treatment, sodium ions contained in the surface layers of the sheet were exchanged for potassium ions contained in the bath of molten potassium nitrate. Since the diameter of the potassium ions is greater than that of the sodium ions, such a treatment sets up compressive stresses in the surface layers of the sheet, such compressive stresses balancing tensile stresses set up in the center of the sheet.

The sheet 1 is encircled by an aluminum channel member 2. An asbestos lining 3 prevents the channel member 2 from directly contacting the metal elements 4 and 5 of the oven wall.

The strength to weight ratio of a sheet 1 of this kind is about 10 times greater than the same ratio for an ordinary thermally tempered sheet of glass.

EXAMPLE 2

The observation window shown in section in FIG. 2 is made up of a sheet 6 of transparent glass 2 mm in thickness and is covered with a coating 7 of $SnO_2$ which is 1500A in thickness. The sheet has a visible light transmission of 65%, and a reflection of 36% of infrared rays of wavelength equal to 2.5 microns. The screen is highly resistant to breakage due to thermal shock.

The sheet 6, furnished with its coating 7, is attached to the steel wall 8 of the oven or furnace via an asbestos joint 9 adapted to deform and absorb the difference between the coefficients of expansion of the materials used. The provision of such a deformable joint is well known in the art.

The sheet 6, of composition identical with that of sheet 1, was given an ion diffusion treatment similar to that described in Example 1.

The observation window shown in FIG. 2 enables infrared radiation to be effectively reflected. It can therefore be used for observing heat sources such as the inside of furnaces, without allowing the passage of intensive infrared radiation.

By way of variant, a coating 7 of indium oxide 1500A in thickness may be used, and this gives a visible light transmission of 70%, and the screen reflects 42% of infrared rays of wavelength equal to 2.5 microns.

When the heat source to be examined is at very high temperatures, the radiation emitted by the source in the visible spectrum is very intense, in which case use is advantageously made of a glass sheet 6 colored with, for instance, cobalt oxide, to protect the observer's eyes. Advantageously the coating 7 is disposed toward the heat source, to prevent overheating of the colored sheet 6.

By way of variant the sheet of glass 6 can be provided with a coating of tin oxide directed toward the inside of the oven or furnace and a layer of cobalt oxide (not shown) on the face directed toward the outside of the oven or furnace.

EXAMPLE 3

FIG. 3 shows in section a screen according to the invention which serves as an observation window for an oven in which foodstuffs are cooked. The observation window takes the form of a double glazing unit made up of two sheets 10 and 11 of transparent glass 30 mm apart.

The sheets, which have the following composition by weight: 64% $SiO_2$, 11% $Na_2O$, 6% CaO, 6% MgO, 8% $B_2O_3$, 5% $Al_2O_3$, and traces of $Fe_2O_3$, were given a high temperature ion diffusion treatment.

Lithium ions were diffused into the surface layers of the glass at a temperature of 590° C. The ions originated from molten salt formed by a mixture of 10% $LiNO_3$ and 90% $NaNO_3$ by weight. Treatment lasted 25 minutes, and imparted a high resistance to thermal shock to the sheets.

After cooling, the sheets of glass were plunged for a minute into an aqueous solution containing 9% hydrofluoric acid.

After the sheet 11 had been rinsed and dried, it was coated with a layer of gold 12 to a thickness of 25A. Such thickness imparted a light transmission of 30% and enabled a reflection of 90% of rays of wavelength equal to 2.5 microns to be reached.

The sheet 10 and the sheet 11 furnished with its coating 12 were kept spaced apart by an aluminum frame member 13.

Contact between the frame member 13 and the steel sheets 14 of the oven wall was prevented by disposing an asbestos joint 15 between the frame member 13 and the steel sheets 14.

The sheet 11 was disposed toward the inside of the oven, and the gold coating 12 was arranged on an interior face of the screen so that it was protected against damage by abrasion.

For a temperature inside the oven of 220° C, a temperature of 55° C was found in the center and on the outer surface of the sheet 10.

EXAMPLE 4

FIG. 4 shows in section an observation window of construction similar to that shown in FIG. 3 for an oven in which foodstuffs are cooked.

The sheets 16 and 17 were given the same low temperature ion diffusion treatment as the sheet 1 shown in FIG. 1, and were of the same composition.

The sheet 17 directed toward the inside of the oven was coated with a layer 18 of $SnO_2$ containing 1.5 atoms of antimony to 100 atoms of tin to a thickness of 2000A. The antimony forms a doping agent for the $SnO_2$ which considerably increases the ability of the coating to reflect infrared radiation.

For a temperature inside the over of 200° C, a temperature of 75° C was found at the center of the outer face of the sheet 16.

EXAMPLES 5 and 6

Figure 6:
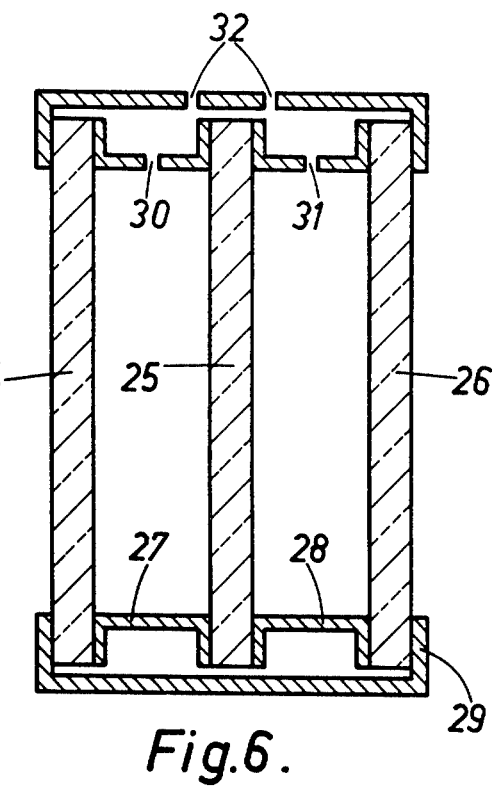

By way of variant, FIGS. 5 and 6 show sections of heat insulating screens which can be used as observation windows for ovens in which foodstuffs are cooked.

The observation windows have no infrared screening coatings.

FIG. 5 shows in section a double glazing unit comprising two sheets 19 and 20 of ordinary glass of the composition given in Example 1, each having a thickness of 3 mm and being 30 mm apart. The sheets 19 and 20 were given a low temperature ion diffusion treatment similar to that described in Example 1.

Aluminum channel members 21 and 22 frame the sheets 19 and 20 respectively.

An aluminum sheet 23 is spot welded to the channel members 21 and 22 to maintain the desired spacing of the sheets.

For a temperature in the oven of 210° C, a temperature of 90° C was found at the center of the outer face of the heat insulating screen.

The screen shown in FIG. 6 comprises three sheets 24, 25 and 26, each identical with those illustrated in FIG. 5. The sheets are spaced 30 mm apart from one another by intermediate steel frame members 27 and 28. A steel outer frame 29 retains the sheets and intermediate frame members. Because of the chemical tempering, the sheets 24, 25 and 26 have a high resistance to mechanical and thermal shock.

FIG. 6 shows apertures 30, 31 and 32 with which the sectional members 27 and 28 and the frame are respectively provided for the ventilation of the inside spaces.

The heat insulating screen shown in FIG. 6 is more efficient than that shown in FIG. 5, since in the embodiments of FIG. 6, for a temperature inside the oven of 210° C, a temperature of 68° C was found at the center of the outer face of the screen.

EXAMPLE 7

The observation windows and heat insulating screens can readily be modified to meet certain particular requirements.

Figure 7:
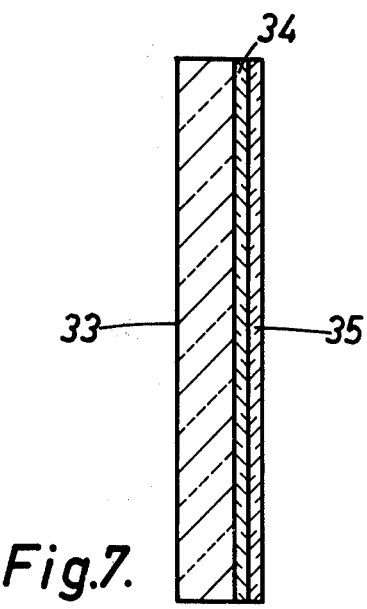
FIGS. 7 and 8 are sections through alternative types of sheet for incorporation into a screen according to the invention.

For instance, one of the sheets in Examples 3–6 can be replaced by the sheet shown in FIG. 7.

Sheet 33 shown in FIG. 7 is identical with the sheet mentioned in Example 1, except that it is coated with a silica layer 34 having a thickness of 100A and a coating 35 of $In_2O_3$ having a thickness of 2000A and containing 2.2% (atomic) of tin to act as a doping agent. The object of the silica layer 34 is to prevent any chemical reaction between the potassium ions contained in the surface layer of the chemically tempered sheet 33 and the indium oxide coating 35, during the formation thereof.

EXAMPLE 8

Figure 8:
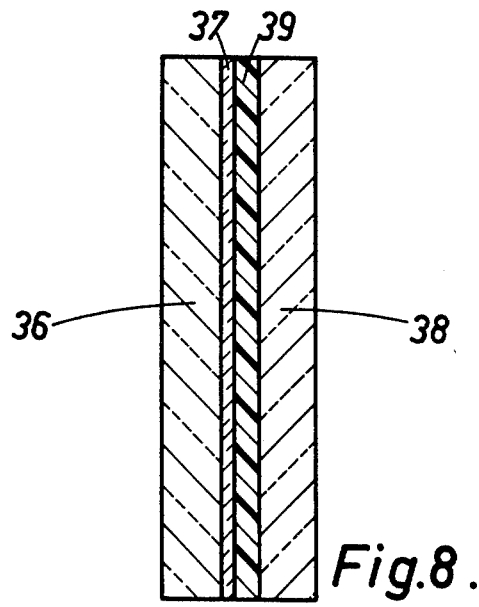

FIG. 8 shows a heat insulating screen suitable for use in making a door for an oven whose temperature of use is not too high. The screen comprises a sheet 36 of chemically tempered glass similar to the sheet 1 described in Example 1. The sheet 36 has a thickness of 2 mm, and is coated with a silver layer 37 having a thickness of 100A. The coated sheet is glued to a sheet 38 of vitrocrystalline material via a layer of polyvinyl butyral 39. The silver layer 100A in thickness has a light transmission of 35% at a wavelength of 6500A.

The sheet 38 has a thickness of 6 mm and its composition is as follows: 48% $SiO_2$, 32% $Al_2O_3$, 10% $Na_2O$, 2% CaO, 8% $TiO_2$, by weight.

The sheet 38 was immersed for 48 hours in a bath of molten $CsNO_3$ at 445° C. The bath also contained 0.2% $Cs_2CO_3$.

The sheet 36 is directed toward the inside of the oven. The silver coating 37 reflects infrared radiation to the inside of the stove.

EXAMPLE 9

Figure 9:
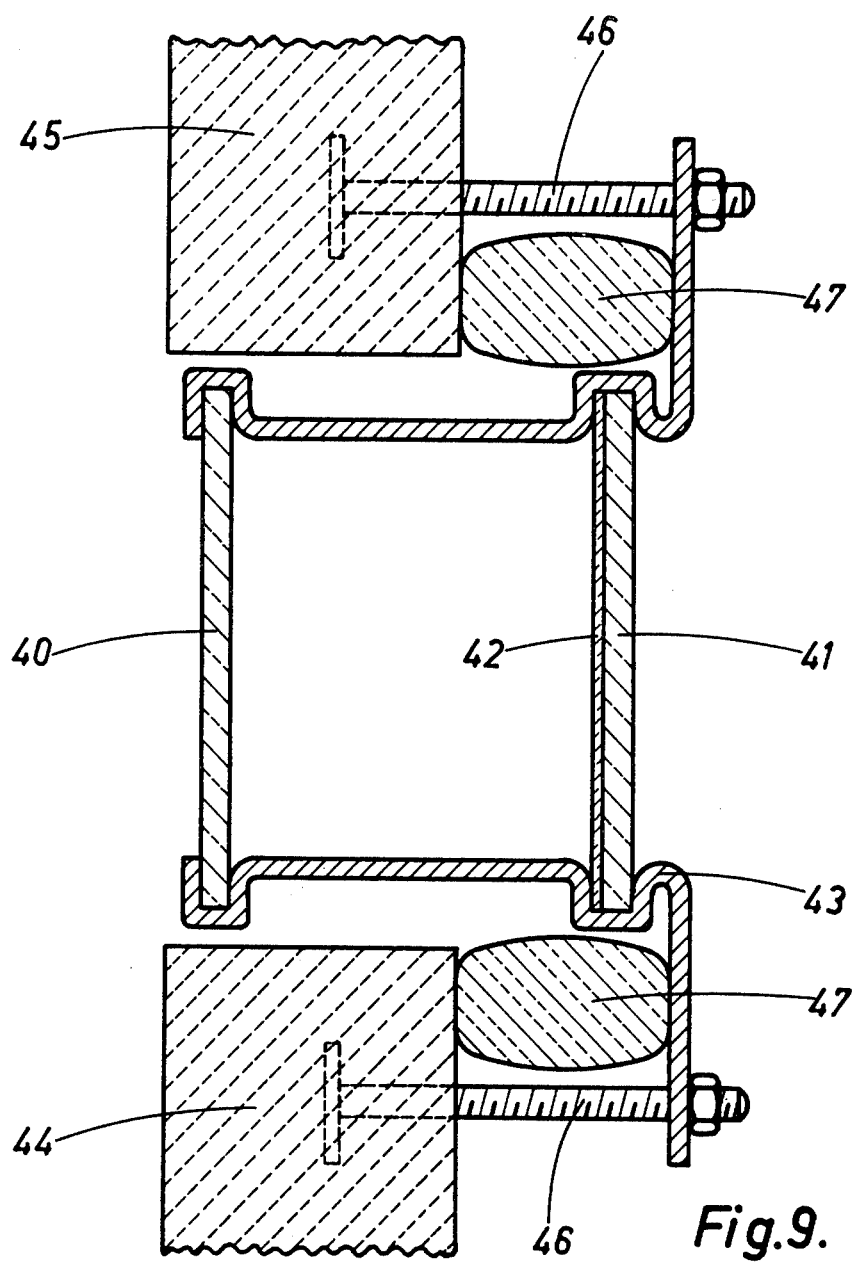
FIG. 9 shows in section a screen used as an observation window in the wall of an industrial glass making furnace.

FIG. 9 shows in section a heat insulating screen installed as an observation window in the wall of an industrial glass manufacturing furnace.

The observation window comprises two sheets 40 and 41 having a thickness of 3 mm. The sheets were of the same composition and were chemically tempered as the sheet described in Example 1. The sheet 41 is disposed on the outside of the furnace and is coated with an aluminum layer 42 having a thickness of 75A which reflects infrared radiation toward the inside of the furnace. The aluminum layer has a light transmission of about 35%.

The sheets 40 and 41 are kept spaced out from one another by a refractory steel frame 43 attached by bolts 46 to blocks 44 and 45 forming part of a wall of the furnace.

Efficient sealing between the wall and the observation window is insured by a joint 47 made from a core braided with chrysotile asbestos around which a jacket of asbestos thread is braided, each strand containing an inconel wire so as to insure satisfactory resistance to pressure.

By way of variant, the aluminum coating 42 may have a thickness of 100A. Such a coating reflects 83% of infrared rays 5 microns in wavelength.

Such a furnace can be used in processes for the melting, shaping or drawing of glass.

EXAMPLE 10

A screen was constructed as shown in FIG. 3 and comprised a sheet 10 of untempered glass, and a sheet 11 of chemically tempered glass bearing a coating 12 of copper which was 110A thick. The sheets of glass were of the same composition as described in Example 1, and the sheet 11, directed toward the inside of a cooking oven, was chemically tempered to give it good resistance to thermal shock as described in that Example. The sheets were 2 mm thick and 30 mm apart. Such a screen was found to give a visible light transmission of 40%, and to reflect 85% of infrared rays of 2.5 microns wavelength. The temperature at the inside of the oven was 260° C, and the temperature at the center of the outer face of the sheet 10 was found to be 71° C. This compares favorably with a test on a screen which was of similar construction, but which did not incorporate an infrared reflecting coating: in this latter case, for an oven temperature of 246° C, the temperature at the center of the outer face of the outer sheet was 101° C.

EXAMPLE 11

A further screen was constructed as shown in FIG. 3 using sheets of glass of the same composition and which had been made highly resistant to thermal shock by being given the same chemical tempering treatment as the sheets described in Example 3. In the present Example however, the coating 12 comprised tin oxide with the addition of fluorine and chlorine ions as doping agents. The coating was approximately 2000A thick, and was applied by spraying onto a glass sheet at a suitable temperature a solution comprising: 46cc $SnCl_4$; 6cc HCl; 0.7cc HF; 11cc methanol; 35cc water and 2cc organic reducer (in this particular example: phenylhydrazine). The visible light transmission of the screen was found to be 80% and the infrared reflection was 30% for a wavelength of 2 microns and approximately 60% for wavelengths greater than 5 microns. With an oven temperature of 220° C, the temperature at the center of the outer face of the outer sheet 10 was found to be 75° C.

EXAMPLE 12

A sheet of chemically tempered glass was coated with indium oxide by spraying a solution of indium chloride (anhydrous or hydrated) dissolved in butylacetate or dimethylformanide onto the sheet when heated. The coating was 2000A to 2500A thick, and the coated sheet was incorporated into a screen as shown in FIG. 3. Both sheets of glass were of the same composition as the sheet described in Example 1, and the sheet 10 directed toward the outside of the oven had been given a low temperature chemical tempering treatment to give it high mechanical strength, while the sheet 11 bearing the indium oxide coating 12 and facing the inside of the oven had been given a high temperature chemical tempering treatment to impart high thermal shock resistance. The construction was as described in Example 3. The light transmission of the screen was found to be 85%, and the proportion of infrared radiation reflected was, for a wavelength of 2.5 microns, 40%, and for wavelengths above 5 microns, 80 – 90%.

EXAMPLE 13

A screen was constructed exactly as described in Example 4 with reference to FIG. 4, except that the chemically tempered glass sheet 17 was replaced with a sheet of untempered borosilicate glass of the following composition: 80% $SiO_2$; 13% $B_2O_3$; 2.25% $Al_2O_3$; 3.8% $Na_2O$; 0.4% $K_2O$ (by weight). The temperature gradient across the screen measured in a test as described in Example 4 was similar to the results given in that Example. The use of a borosilicate glass sheet directed toward the inside of an oven or furnace enables the screen to withstand very high furnace temperatures.

EXAMPLE 14

Another screen was constructed in accordance with FIG. 4 and as described in Example 4, but in this case, the coating 18 was of palladium, 120A thick. This allowed a visible light transmission of 30%, and reflected a substantial quantity of infrared radiation, so that for an oven temperature of 246° C, the temperature at the center of the outer face of the outer sheet 16 was 92.5° C.

In a variant, the coating 18 of palladium was refused to 80A in thickness, and was supplemented by a similar coating (not shown) on the inner face of the outer sheet 16. For the same oven temperature, the center of the outer face of the outer sheet 16 was found to be 86° C, but the visible light transmission was reduced to 16%.

EXAMPLE 15

A further screen was constructed in accordance with the description given in Example 4 with reference to FIG. 4, but in this case, the coating 18 was of titanium nitride between 2000A and 2500A thick. This coating was found to be extremely hard and of high resistance to chemical attack, so that it is particularly suitable for use on one of the exterior faces of a heat insulating screen according to the invention where there might be a risk of scratching or chemical damage. The thickness of coating used gave a visible light transmission of 50 to 60%, and a substantial degree of infrared reflection, so that the temperature at the center of the outside face of the screen was 55° C when the oven temperature was 220° C.

EXAMPLE 16

A screen of similar construction to that shown in FIG. 5 was made using a sheet 19 of chemically tempered glass of ordinary composition and a sheet 20 of borosilicate glass of the composition given in Example 13. The borosilicate sheet 20 was directed toward the heat source. A thermal gradient test as described in Example 5 was conducted, and the results were similar to those obtained in that Example. The screen of the present example was able to withstand higher furnace temperatures due to the use of the borosilicate glass sheet.

EXAMPLE 17

Figure 10:
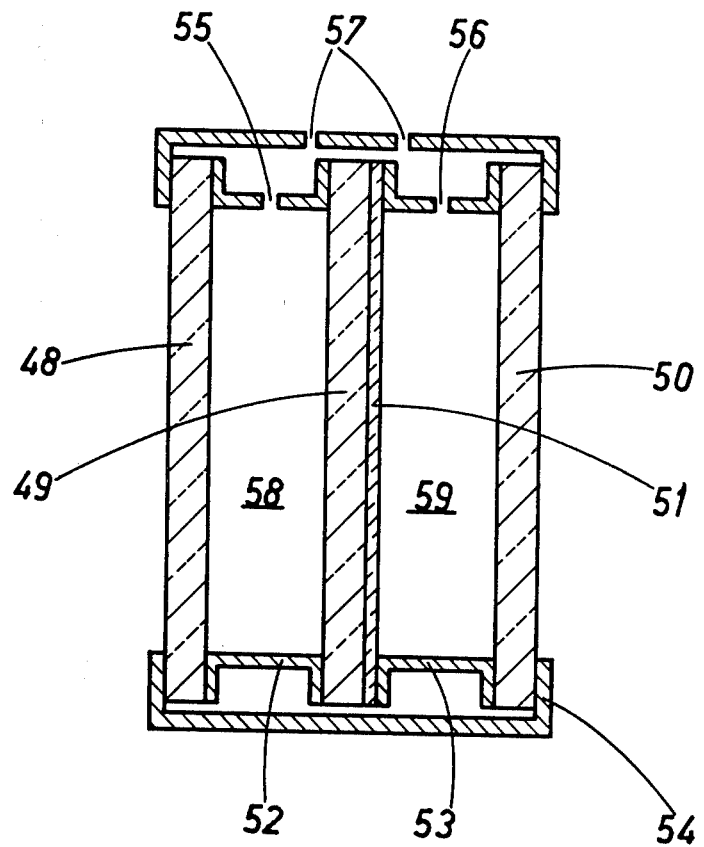
FIG. 10 is a variant of the screen shown in FIG. 6.

A screen was constructed wherein, with reference to FIG. 10, the outer sheet 48 was of chemically tempered glass of ordinary composition (as given in Example 1), the middle sheet 49 was of ordinary untempered glass and the sheet 50 directed toward the heat source was of a borosilicate glass of the same composition as used in Example 13. Each sheet was 3 mm thick, and the sheets were held 30 mm apart by spacer members 52 and 53. The middle sheet 49 was given a coating 51 of tin oxide 2000A to which had been added 1.5 atoms of antimony per 100 atoms of tin to act as a doping agent. The screen was held within a frame 54. Holes 55, 56 and 57 were provided respectively in the spacer members 52 and 53 and the frame 54, so that the interior spaces 58 and 59 of the screen could be ventilated. With an oven temperature of 220° C, the temperature at the center of the outer face of the outer sheet 48 was found to be 55° C.

While the coatings specified in the Examples are in all cases satisfactory, some are more efficient than others. The most efficient infrared reflectors are the metals, followed by the oxides, nitrides, carbides and sulphides in descending order. In terms of visible light transmission however, oxides are the best, followed by nitrides. Metal, carbide or sulphide coatings do not permit such a high degree of light transmission in the thicknesses required.

The invention is not limited to the foregoing Examples. Other arrangements of glass or vitrocrystalline sheets can be selected without exceeding the scope of the invention as defined in the appendant claims, and other ion diffusion treatments than those set forth hereinbefore can also be used.

What is claimed is:

1. In an oven or furnace, the combination with a wall thereof having an opening therein of a heat insulating screen mounted in said opening, said heat insulating screen comprising two transparent sheets of glass or vitrocrystalline material disposed in facing relation to each other, the sheet which is directed toward the outside of the oven or furnace being chemically tempered, and the sheet which is directed toward the inside of the oven or furnace bearing an infrared screening coating wherein said infrared screening coating comprises an oxide or a mixture of oxides, at least one oxide selected from the group consisting of tin oxide and indium oxide, said coated sheet having a low energy transmission and a high energy reflection in the wavelength range of from about 0.8–15 microns.

2. The combination as recited in claim 1 wherein said oxide coating contains a doping agent.

3. The combination as recited in claim 2 wherein said infrared screening coating comprises tin oxide and said doping agent comprises ions or atoms of antimony and/or fluorine and/or chlorine.

4. The combination as recited in claim 2 wherein said infrared screening coating comprises indium oxide and said doping agent comprises ions or atoms of tin and/or fluorine and/or chlorine.

5. The combination as recited in claim 1 wherein said infrared screening coating has a minimum thickness of 1000A.

6. The combination as recited in claim 1 wherein beneath said infrared screening coating there is a foundation layer of material which is chemically inert in relation to such coating and the material of the coated face of the coated sheet.

7. The combination as recited in claim 6 wherein said coating comprises indium oxide and said foundation layer comprises silica.

8. The combination as recited in claim 1 a wherein the visible light transmission of the screen is greater than or equal to 20%.

9. The combination as recited in claim 1 wherein said sheet bearing said infrared screening coating has been chemically tempered.

10. A heat insulating screen according to claim 1 wherein beneath said coating there is a foundation layer of material which is chemically inert in relation to such coating and the material of the coated face of the coated sheet.

11. A heat insulating screen according to claim 10 wherein said coating comprises indium oxide and said foundation layer comprises silica.

12. A heat insulating screen adapted to form part of an oven or furnace, comprising first and second transparent sheets of glass or vitrocrystalline material disposed in facing relation to each other, the first sheet which is directed toward the outside of the oven or furnace being chemically tempered, and the second sheet which is directed toward the inside of the oven or furnace including means having a low energy transmission and a high energy reflection in the wavelength range of from about 0.8 to 15 microns, said means including an infrared screening coating on said second sheet, wherein said coating comprises an oxide or a mixture of oxides, at least one oxide selected from the group consisting of tin oxide and indium oxide.

13. A screen as recited in claim 12, wherein said second sheet is composed of a borosilicate glass, which has a coefficient of thermal expansion of less than $5 \times 10^{-6}$/° C.

14. A heat insulating screen according to claim 12 wherein said chemically tempered glass or vitrocrystalline sheet is a sheet which has been subjected to a chemical tempering treatment of a kind involving the exchange of alkali metal ions between the sheet and a treatment medium.

15. A heat insulating screen according to claim 14 wherein said chemically tempered glass or vitrocrystalline sheet is a sheet which has been subjected to a chemical treatment involving the diffusion of potassium ions into the sheet in exchange for sodium ions.

16. A heat insulating screen according to claim 12 wherein said sheets are spaced apart by a distance at least equal to the thickness of a sheet which is of minimum thickness in relation to all of the sheet thicknesses provided.

17. A heat insulating screen according to claim 12 wherein said oxide coating contains a doping agent.

18. A heat insulating screen according to claim 17 wherein said doping agent comprises ions or atoms of antimony and/or fluorine and/or chlorine in the case of a coating of tin oxide.

19. A heat insulating screen according to claim 17 wherein said doping agent comprises ions or atoms of tin and/or fluorine and/or chlorine in the case of a coating of indium oxide.

20. A heat insulating screen according to claim 12 wherein said oxide coating has a minimum thickness of 1000A.

21. A heat insulating screen according to claim 12 wherein the visible light transmission of the screen is greater than or equal to 20%.

* * * * *